US012574217B2

(12) United States Patent
Kalidas

(10) Patent No.: US 12,574,217 B2
(45) Date of Patent: Mar. 10, 2026

(54) CACHE MANAGEMENT FOR CRYPTOGRAPHIC KEYS

(71) Applicant: Truist Bank, Charlotte, NC (US)

(72) Inventor: Arjun Kalidas, Charlotte, NC (US)

(73) Assignee: TRUIST BANK, Charlotte, NC (US)

( * ) Notice: Subject to any disclaimer, the term of this patent is extended or adjusted under 35 U.S.C. 154(b) by 404 days.

(21) Appl. No.: 18/447,687

(22) Filed: Aug. 10, 2023

(65) Prior Publication Data

US 2025/0055674 A1     Feb. 13, 2025

(51) Int. Cl.
*H04L 9/08* (2006.01)
*G06F 12/123* (2016.01)

(52) U.S. Cl.
CPC .......... *H04L 9/0825* (2013.01); *G06F 12/123* (2013.01); *H04L 9/0894* (2013.01)

(58) Field of Classification Search
None
See application file for complete search history.

(56) References Cited

U.S. PATENT DOCUMENTS

| | | | |
|---|---|---|---|
| 8,494,168 B1* | 7/2013 | Tolfmans | G06F 21/602 |
| | | | 380/47 |
| 9,374,344 B1* | 6/2016 | Takahashi | H04L 63/0428 |
| 2017/0359317 A1* | 12/2017 | Anderson | G06F 21/602 |
| 2021/0055927 A1* | 2/2021 | Sarukkai | G06F 8/71 |
| 2023/0289751 A1* | 9/2023 | Wied | G06Q 20/02 |

* cited by examiner

*Primary Examiner* — Atta Khan
(74) *Attorney, Agent, or Firm* — Michael A. Springs, Esq.; Shumaker, Loop & Kendrick, LLP; Patrick B. Horne

(57)     ABSTRACT
Systems and methods for cryptographic key storage management whereby the system receives a first request to access a first API and communicatively connects a channel to a key management service (KMS) that is on a serverless computing platform. After receiving a cryptographic key from the KMS, the system attaches the cryptographic key to the first API, thereby creating a first data structure. The system stores the first data structure to a writable storage location that has a predetermined maximum capacity for data structures. The system receives a second request to access the first API and retrieves and uses the stored first data structure to grant access to the first API. The system also determines when the writable storage location has reached the predetermined capacity and determines and evicts a least recently used data structure stored to the writable storage location.

18 Claims, 3 Drawing Sheets

300

RECEIVE A FIRST REQUEST TO ACCESS A FIRST APPLICATION PROGRAMMING INTERFACE
305

COMMUNICATIVELY CONNECT A CHANNEL TO A KEY MANAGEMENT SERVICE, WHEREIN THE KEY MANAGEMENT SERVICE COMPRISES A SERVERLESS COMPUTING PLATFORM
310

RECEIVE A CRYPTOGRAPHIC KEY FROM THE KEY MANAGEMENT SERVICE
315

ATTACH THE CRYPTOGRAPHIC KEY TO THE FIRST APPLICATION PROGRAMMING INTERFACE, THEREBY CREATING A FIRST DATA STRUCTURE
320

STORE THE FIRST DATA STRUCTURE TO A WRITABLE STORAGE LOCATION, WHEREIN THE WRITABLE STORAGE LOCATION HAS A PREDETERMINED MAXIMUM CAPACITY FOR DATA STRUCTURES
325

RECEIVE A SECOND REQUEST TO ACCESS THE FIRST APPLICATION PROGRAMMING INTERFACE
330

RETRIEVE AND USE THE STORED FIRST DATA STRUCTURE TO GRANT ACCESS TO THE FIRST APPLICATION PROGRAMMING INTERFACE
335

300

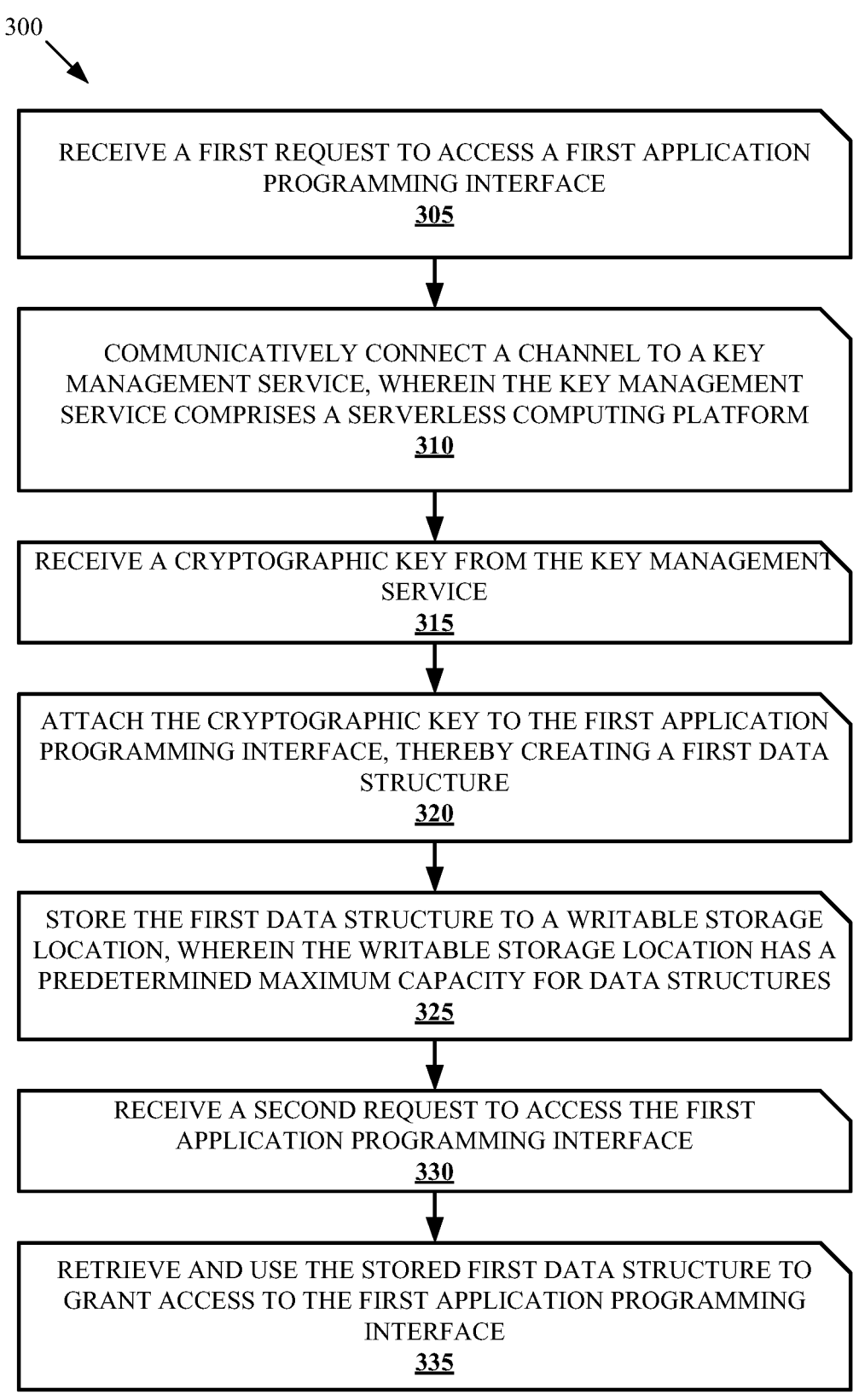

RECEIVE A FIRST REQUEST TO ACCESS A FIRST APPLICATION PROGRAMMING INTERFACE
305

COMMUNICATIVELY CONNECT A CHANNEL TO A KEY MANAGEMENT SERVICE, WHEREIN THE KEY MANAGEMENT SERVICE COMPRISES A SERVERLESS COMPUTING PLATFORM
310

RECEIVE A CRYPTOGRAPHIC KEY FROM THE KEY MANAGEMENT SERVICE
315

ATTACH THE CRYPTOGRAPHIC KEY TO THE FIRST APPLICATION PROGRAMMING INTERFACE, THEREBY CREATING A FIRST DATA STRUCTURE
320

STORE THE FIRST DATA STRUCTURE TO A WRITABLE STORAGE LOCATION, WHEREIN THE WRITABLE STORAGE LOCATION HAS A PREDETERMINED MAXIMUM CAPACITY FOR DATA STRUCTURES
325

RECEIVE A SECOND REQUEST TO ACCESS THE FIRST APPLICATION PROGRAMMING INTERFACE
330

RETRIEVE AND USE THE STORED FIRST DATA STRUCTURE TO GRANT ACCESS TO THE FIRST APPLICATION PROGRAMMING INTERFACE
335

FIG. 3

CACHE MANAGEMENT FOR CRYPTOGRAPHIC KEYS

FIELD OF THE INVENTION

This invention relates generally to the field of cryptographic keys, and more particularly embodiments of the invention relate to effective cache management for cryptographic keys.

BACKGROUND OF THE INVENTION

Cryptographic keys are fundamental components in modern cryptography. They are essentially strings of characters used to encrypt and decrypt data. There are two main types of cryptographic keys: symmetric keys and asymmetric keys. Symmetric keys are shared between communicating parties and are used for both encryption and decryption. The same key is used for both operations, and it is important to keep the key secure since any user who possesses it can decrypt the encrypted data. Asymmetric keys, on the other hand, come in pairs: a public key and a private key. The public key is freely distributed and is used for encryption, while the private key is kept secret and is used for decryption. Messages encrypted with a public key can only be decrypted with the corresponding private key, providing a higher level of security. Cryptographic keys are vital for securing sensitive information, ensuring data integrity, and enabling secure communication over networks. They are used in various cryptographic algorithms, such as RSA, AES, and Diffie-Hellman, to protect data and enable secure transactions.

AWS KMS (Amazon Web Services Key Management Service) is a managed service that helps a user create and control cryptographic or encryption keys used for encrypting and decrypting your data. It provides a secure way to manage cryptographic keys and integrates with various AWS services and applications. KMS is primarily focused on key management and encryption, ensuring the confidentiality and integrity of your data.

Network calls must be made to fetch keys from AWS KMS. When an application programming interface (API) requests a key, the key is used and then discarded. Thus, the same application programming interface may request the same key thousands of times. This takes time, causes latency, and there is also a cost for each key requested.

Thus, a need exists for improved systems and methods for effective cache management for cryptographic keys.

BRIEF SUMMARY

Shortcomings of the prior art are overcome and additional advantages are provided through the provision of a computing system for cache management for cryptographic keys. The system includes at least one processor, a communication interface communicatively coupled to the at least one processor, and a memory device storing executable code. When the executable code is executed, it causes the at least one processor to, at least in part, receive a first request to access a first application programming interface. The system communicatively connects a channel to a key management service, where the key management service is a serverless computing platform. After receiving a cryptographic key from the key management service, the system attaches the cryptographic key to the first application programming interface, thereby creating a first data structure. The system stores the first data structure to a writable storage location that has a predetermined maximum capacity for data structures. The system receives a second request to access the first application programming interface, and retrieves and uses the cryptographic key from the stored first data structure to grant access to the first application programming interface.

Additionally disclosed herein is a computing system for cryptographic key storage management that includes at least one processor, a communication interface communicatively coupled to the at least one processor, and a memory device storing executable code. The executable code, when executed, causes the at least one processor to receive a first cryptographic key from a key management service that is a serverless computing platform. The system attaches the first cryptographic key to a first application programming interface, thereby creating a first data structure. The system may also receive a second cryptographic key from the key management service and attach the second cryptographic key to a second application programming interface, thereby creating a second data structure. The system stores the first data structure and the second data structure to a storage location. After receiving a request to access the first application programming interface, the system retrieves and uses the stored first data structure to grant access to the first application programming interface.

Also disclosed herein is a computer-implemented method for cryptographic key storage management, the method including: (1) receiving a first request to access a first application programming interface; (2) communicatively connecting a channel to a key management service that is maintained on a serverless computing platform; (3) receiving a cryptographic key from the key management service; (4) attaching the cryptographic key to the first application programming interface, thereby creating a first data structure; (5) storing the first data structure to a writable storage location, where the writable storage location has a predetermined maximum capacity for data structures; (6) receiving a second request to access the first application programming interface; and (7) retrieving and using the cryptographic key from the stored first data structure to grant access to the first application programming interface.

The features, functions, and advantages that have been described herein may be achieved independently in various embodiments of the present invention including computer-implemented methods, computer program products, and computing systems or may be combined in yet other embodiments, further details of which can be seen with reference to the following description and drawings.

BRIEF DESCRIPTION

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

FIG. 3 depicts a block diagram of an example method for cache management of cryptographic keys, in accordance with an embodiment of the present invention.

DETAILED DESCRIPTION

Figure 1:
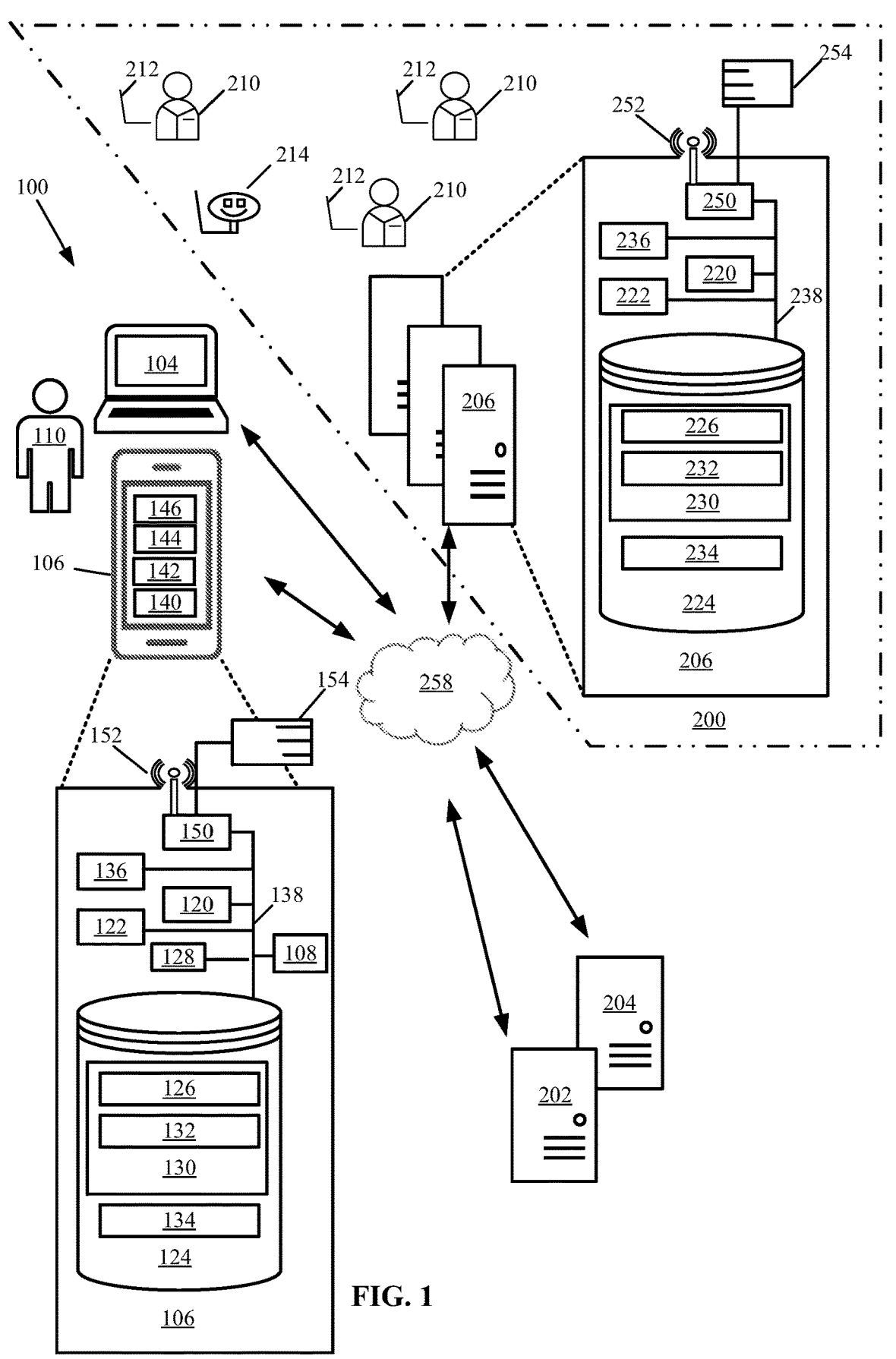
FIG. 1 illustrates an example computing environment that facilitates effective cache management of cryptographic keys, in accordance with an embodiment of the present invention.

Aspects of the present invention and certain features, advantages, and details thereof are explained more fully below with reference to the non-limiting examples illustrated in the accompanying drawings. It is to be understood that the disclosed embodiments are merely illustrative of the present invention and the invention may take various forms. Further, the figures are not necessarily drawn to scale, as some features may be exaggerated to show details of particular components. Thus, specific structural and functional details illustrated herein are not to be interpreted as limiting, but merely as a representative basis for teaching one skilled in the art to employ the present invention.

Descriptions of well-known processing techniques, systems, components, etc. are omitted to not unnecessarily obscure the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

The specification may include references to "one embodiment," "an embodiment," "various embodiments," "one or more embodiments," etc. may indicate that the embodiment(s) described may include a particular feature, structure or characteristic, but every embodiment may not necessarily include the particular feature, structure, or characteristic. In some cases, such phrases are not necessarily referencing the same embodiment. When a particular feature, structure, or characteristic is described in connection with an embodiment, such description can be combined with features, structures, or characteristics described in connection with other embodiments, regardless of whether such combinations are explicitly described. Thus, unless described or implied as exclusive alternatives, features throughout the drawings and descriptions should be taken as cumulative, such that features expressly associated with some particular embodiments can be combined with other embodiments.

Like numbers refer to like elements throughout. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "couple," "coupled," "couples," "coupling," "fixed," "attached to", and the like should be broadly understood to refer to connecting two or more elements or signals electrically and/or mechanically, either directly or indirectly through intervening circuitry and/or elements. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled. Coupling (whether only mechanical, only electrical, or both) may be for any length of time, e.g., permanent or semi-permanent or only for an instant. "Communicatively coupled to" and "operatively coupled to" can refer to physically and/or electrically related components.

In addition, as used herein, the terms "about", "approximately", or "substantially" for any numerical values or ranges indicate a suitable dimensional tolerance that allows the device, part, or collection of components to function for its intended purpose as described herein.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code can include both software and hardware. For example, program code in certain embodiments of the present invention can include fixed function hardware, while other embodiments can utilize a software-based implementation of the functionality described. Certain embodiments combine both types of program code.

As used herein, the terms "enterprise" or "provider" generally describes a person or business enterprise that hosts, maintains, or uses computer systems that provide functionality for the disclosed systems and methods. In particular, the term "enterprise" may generally describe a person or business enterprise providing goods or services. Interactions between an enterprise system and a user device can be implemented as an interaction between a computing system of the enterprise, and a user device of a user. For instance, user(s) may provide various inputs that can be interpreted and analyzed using processing systems of the user device and/or processing systems of the enterprise system. Further the enterprise computing system and the user device may be in communication via a network. According to various embodiments, the enterprise system and/or user device(s) may also be in communication with another external or third-party server of a third party system that may be used to perform one or more server operations. In some embodiments, the functions of one illustrated system or server may be provided by multiple systems, servers, or computing devices, including those physically located at a central computer processing facility and/or those physically located at remote locations.

Embodiments of the present invention are described herein, with reference to flowchart illustrations and/or block diagrams of computer-implemented methods and computing systems according to embodiments of the invention. Each block of the flowchart illustrations and/or block diagrams, and combinations of blocks in the flowchart illustrations and/or block diagrams, can be implemented by computer readable program instructions that may be provided to a processor of a general purpose computer, special purpose computer, or other programmable data processing apparatus or apparatuses (the term "apparatus" includes systems and computer program products). In particular, the computer readable program instructions, which be executed via the processor of the computer or other programmable data processing apparatus, create a means for implementing the functions/acts specified in the flowchart and/or block diagram block or blocks.

In one embodiment, these computer readable program instructions may also be stored in one or more computer-readable storage media that can direct a computer or other programmable data processing apparatus, and/or other devices, to function in a particular manger, such that a computer readable storage medium of the one or more computer-readable storage media having instructions stored therein comprises an article of manufacture including instructions which implement aspects of the actions specified in the flowchart illustrations and/or block diagrams. In particular, the computer-readable program instructions may be used to produce a computer-implemented method by executing the instructions to implement the actions specified in the flowchart illustrations and/or block diagram block or blocks.

In another embodiment, these computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions, whether stored in the computer-readable storage medium and/or computer-readable memory may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

In the flowchart illustrations and/or block diagrams disclosed herein, each block in the flowchart/diagrams may represent a module, segment, a specific instruction/function or portion of instructions/functions, and incorporates one or more executable instructions for implementing the specified logical function(s). Additionally, the alternative implementations and processes may also incorporate various blocks of the flowcharts and block diagrams. For instance, in some implementations the functions noted in the blocks may occur out of the order noted in the figures. For example, two blocks shown in succession may be executed substantially concurrently, or the functions of the blocks may sometimes be executed in the reverse order, depending upon the functionality involved.

FIG. 1 illustrates a computing environment 100 that facilitates cache management of cryptographic keys, according to at least one embodiment of the present invention. The computing environment 100 generally includes a user 110 (e.g., an employee of an enterprise) that benefits through use of services and products offered by the enterprise system 200. The computing environment 100 may include, for example, a distributed cloud computing environment (private cloud, public cloud, community cloud, and/or hybrid cloud), an on-premise environment, fog-computing environment, and/or an edge-computing environment. The user 110 accesses services and products of the enterprise system 200 by use of one or more user devices, illustrated in separate examples as 104, 106. Example user devices 104, 106 may include a laptop, desktop computer, tablet, a mobile computing device such as a smart phone, a portable digital assistant (PDA), a pager, a mobile television, a gaming device, an audio/video player, a virtual assistant device or other smart home device, a wireless personal response device, or any combination of the aforementioned, or other portable device with processing and communication capabilities.

In the illustrated example, the mobile device 106 is illustrated in FIG. 1 as having exemplary elements, the below descriptions of which apply as well to the computing device 104. The user device 104, 106 can include integrated software applications that manage device resources, generate user interfaces, accept user inputs, and facilitate communications with other devices among other functions. The integrated software applications can include an operating system, such as Linux®, UNIX®, Windows®, macOS®, iOS®, Android®, or other operating system compatible with personal computing devices. Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system used on personal computers, central computing systems, phones, and other devices.

The user 110 can be any individual, a group, entity, etc. that is in possession of or has access to the user device 104, 106, which may be personal or public items. Although the user 110 may be singly represented in some figures, in at least in some embodiments the user 110 is one of many such that a group of users through multiple user devices utilize the computing environment 100 to communicate with the enterprise system 200.

The user device 104, 106, but as illustrated with reference to the mobile device 106, includes components such as, at least one of each of a processor 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processor 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user, or required or related to any or all of the applications or programs 130.

The memory device 122 is operatively coupled to the processor 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory additionally or alternatively can include an electrically erasable programmable read-only memory (EEPROM), flash memory or the like.

According to various embodiments, the memory device 122 and storage device 124 may be combined into a single storage medium. The memory device 122 and storage device 124 can store any of a number of applications that comprise computer-executable instructions and code executed by the processing device 120 to implement the functions of the user device 104, 106 described herein. For example, the memory device 122 may include such applications as a conventional web browser application and/or an enterprise-distributed application (e.g., a mobile application), collectively referred to herein as a "web portal". These applications also typically provide a graphical user interface (GUI) on the display 140 that allows the user 110 to communicate via the user device 104, 106 with, for example, an enterprise system 200, and/or other devices or systems. For instance, the GUI on the display 140 may include features for displaying information and accepting inputs from users, and may include fillable text boxes, data fields, hyperlinks, pull down menus, check boxes, and the like.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices may include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Further non-limiting examples of input devices and/or output devices of the input and output system 136 may include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

According to one embodiment, the input and output system 136 may include an optical instrument (e.g., camera 146) configured to capture an image. For instance, the optical instrument may include one or more lenses and one or more image sensors (e.g., a charge coupled device (CCD) sensor) configured to convert photons into an electrical signal. For example, pixels of each the image sensors may each include a photodiode (e.g., a semiconductor) that becomes electrically charged in accordance with the strength of the light that strikes the photodiode, where the electrical charge is then relayed to be converted to an electrical signal. In one embodiment, a series of pulses may be applied to the one or more image sensors to relay the accumulate charges within each photodiode in succession down a row of photodiodes to an edge of the respective image sensor. Other optical instrument functionalities are also contemplated herein.

In one embodiment, the input and output system 136 may also be configured to obtain and process various forms of authentication to obtain authentication information of a user 110 in order to provide, for example, access to a specific web portal of the enterprise system 200. For instance, the web portal may be accessed based on the user providing authentication information to log in to the web portal in order to perform various functionalities described herein. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a Global Positioning System (GPS) configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138 (e.g., system bus), connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, short message service (SMS), enterprise messaging service (EMS), multimedia messaging service (MMS) messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS may be included for navigation and location-related data exchanges, ingoing and/or outgoing. Communications may also or alternatively be conducted via the connector 154 for wired connections such as by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

Computing environment 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, a single system or server may provide the functions of one or more systems, servers, or illustrated components. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more human agents 210, and as an input device by providing virtual buttons, selectable options, a virtual keyboard, and other indicia that, when touched or activated, control or prompt the agent device 212 by action of the human agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

The computing system 206 may have various components similar to the user device 104, 106. For instance, in one example the computing system 206 may include at least one of each of a processing device 220, and a memory device 222 for use by the processing device 220, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data and files, such as those for user accounts, user profiles, enterprise data, files downloaded or received from other devices, and other data items preferred by the user and/or enterprise or required or related to any or all of the applications or programs 230.

As illustrated, the computing system 206 includes an input/output system 236, which generally refers to, includes, and/or is operatively coupled with agent devices 212 and automated system(s) 214, as well as various other input and output devices. According to various embodiments, the computing system 206 may be used to distribute the digital data collection program as, for example a Software-as-a-Service (SaaS) that can be accessed by the user device 104, 106 on a subscription basis via a web browser or mobile application. SaaS may provide a user 110 with the capability to use applications running on a cloud infrastructure of the enterprise system 200, where the applications are accessible using the user device 104, 106 via a thin client interface such as a web browser and the user 110 is not permitted to manage or control the underlying cloud infrastructure (i.e., network, servers, operating systems, storage, or specific application capabilities that are not user-specific) of the enterprise system 200.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device 104, 106.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, near-field communication device, and other transceivers. In addition, GPS may be included for navigation and location-related data exchanges, ingoing and/or outgoing. Communications may also, or alternatively, be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing system 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices 104, 106, the agent devices 212, computing system 206, which may be one or any number centrally located or distributed, are in communication through one or more networks, referenced as network 258 in FIG. 1.

The network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of this description. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMAX, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, frames using frame relay, voice, video, data, and other suitable information between network addresses. The network 258 may also include one or more local area networks (LANs), radio access networks (RANs), metropolitan area networks (MANs), wide area networks (WANs), personal area networks (PANs), WLANs, campus area network (CAN), storage-area network (SAN), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public). In one particular embodiment, the network 258 includes Amazon Web Services (AWS) cloud computing platform.

Two external systems 202 and 204 are expressly illustrated in FIG. 1, representing any number and variety of data sources, users, consumers, customers, third-party PaaS, third-party IaaS, external databases, business entities, banking systems, enterprises, organizations, institutions, companies, government entities, clubs, and groups of any size are all within the scope of the description. According to various embodiments, external systems 202 and 204 may utilize software applications that function using external resources that are available through a third-party provider such as SaaS, PaaS, or IaaS service models. Such external systems 202, 204 include the third party systems accessible via the agent devices 212 using a software application (e.g., an integrated mobile software application or an application programming interface (API) software application) that can be integrated with the computing system 206 to facilitate communication between software and systems and also configured to utilize different data formats between systems. In another embodiment, the third party system may be accessible by the agent devices 212 using a web-based software interface (e.g., a website).

In certain embodiments, one or more of the systems described herein such as the user device (referring to either or both of the computing device 104 and the mobile device 106), the enterprise system 200, and/or the external systems 202 and 204 are, include, or utilize virtual resources. Such virtual resources are or include cloud resources or virtual machines. The virtual resources may utilize a cloud-computing configuration to provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud-computing configuration so that the resources may be shared as needed.

Amazon Web Services Key Management Service (AWS KMS) is a managed service provided by Amazon Web Services (AWS) that allows a user to create, manage, and control encryption keys. AWS KMS simplifies the process of creating and managing encryption keys that are used to encrypt and decrypt data in various AWS services and applications. It provides a highly secure and scalable infrastructure for key management. AWS KMS organizes keys into a hierarchy. At the top level, there are customer master keys (CMKs) that can be used to encrypt and decrypt data directly. These CMKs are then used to generate and manage data encryption keys (DEKs) for specific use cases. AWS KMS seamlessly integrates with various AWS services, such as Amazon S3, Amazon EBS, Amazon RDS, and Amazon Redshift, allowing a user to easily encrypt data at rest or in transit. AWS KMS provides fine-grained access controls and policy management for keys. A user can define which users can access and use the keys, which AWS services or accounts can access the keys, and what operations the keys can perform. AWS KMS logs all key usage and API requests in AWS CloudTrail, providing detailed audit trails for compliance and security purposes. AWS KMS leverages Hardware Security Modules (HSM) to protect the security and integrity of keys. HSMs are tamper-resistant hardware devices that provide additional security and key protection.

In general, APIs are software-to-software interfaces that allow different applications to communicate and exchange information or functionality, which advantageously allows businesses to exchange and access data, code, software, or services and extend functionality of various products. An API call is the process in which a client application submits a request for data to an API, the API retrieves the requested data from an external server or program and delivers the requested data to the client. An API call includes the uniform resource identifier (URI) of the server or external program in which the requested data is stored as well as a hypertext transfer protocol (HTTP) method (e.g. POST, GET, PUT, PATCH, DELETE, HEAD, OPTIONS, CONNECT, TRACE). In one embodiment, when a backend API call is initiated by a client, an HTTP request is sent from a client (e.g. browser) to the server, and the server returns a response to the client that includes status information about the request and/or the requested content. when making API backend calls, encryption keys are typically used to secure the communication between the client and the server.

However, an issue arises in a serverless computing platform such as Amazon Web Services (AWS) Lambda, there is not an effective way of storing encryption keys received from the AWS KMS. Thus, a need exists for cryptographic key storage in a serverless environment. Current technology repetitive API calls to retrieve cryptographic keys, many times requiring duplicate retrieval of the same cryptographic key. The invention disclosed herein eliminates the cost and time required for making repetitive API calls for the same cryptographic key by attaching the cryptographic key to the particular API and storing it in cache for later retrieval.

Figure 2:
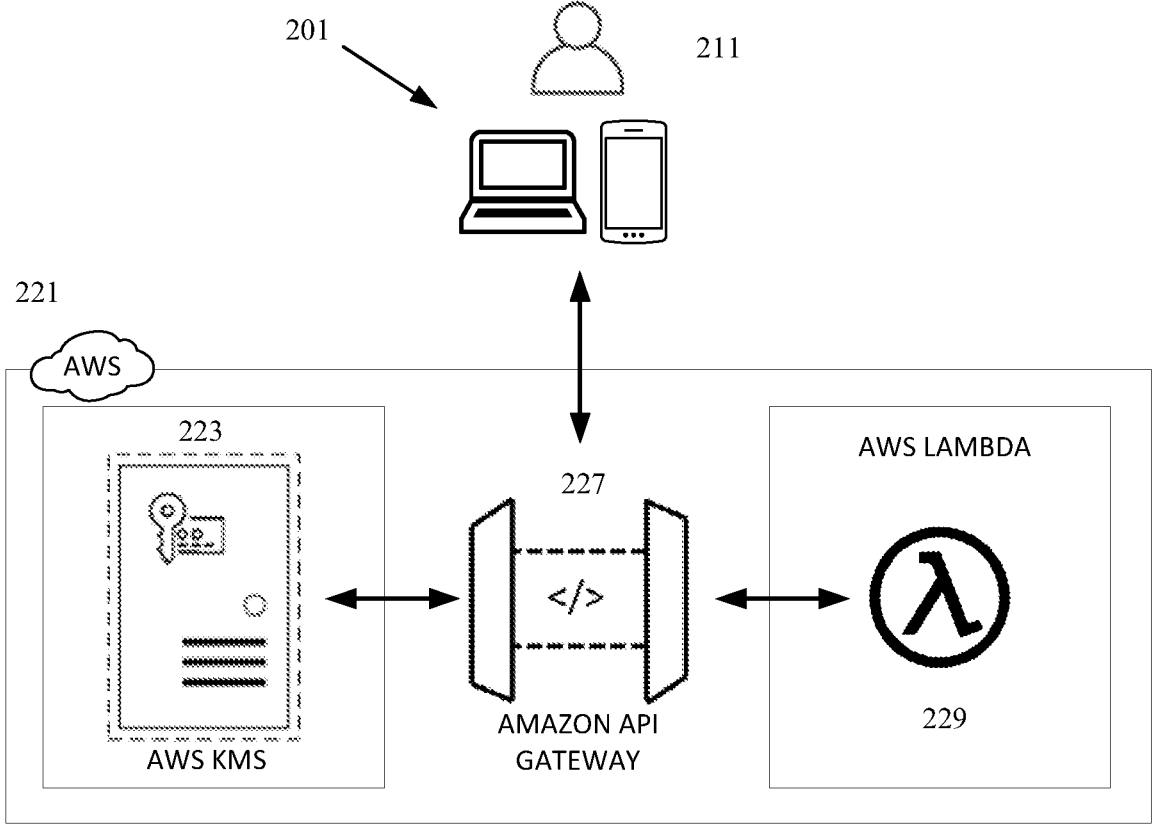
FIG. 2 depicts an example methodology for cache management of cryptographic keys, in accordance with an embodiment of the present invention.

FIG. 2 depicts an example methodology for cache management for cryptographic keys, according to one embodiment. Specifically, a cryptographic key can be requested from the AWS KMS. In some embodiments, the developer 211 creates a Lambda function that performs logic for the API, which can be written in a number of programming languages and can access data from the AWS KMS 223. Further, the developer 211 can create an Amazon API Gateway 227 that uses the lambda function as the backend and expose the Lambda function to handle requests from a variety of clients. When a client device 201 sends a request to the Amazon API Gateway 227, the request is then forwarded on to the Lambda function in order to perform any necessary processing, and then the Amazon API Gateway 227 returns the response to the client device 201. The response can be, according to various embodiments, in various formats including JavaScript Object Notation (JSON) or extensible markup language (XML) and can include data from the Lambda function.

FIG. 3 depicts a block diagram of an example method 300 for cache management and storage of cryptographic keys, in accordance with an embodiment of the present invention. At block 305, a first request to access a first application programming interface is received. In example embodiments, the request comes from a client or user requesting access to a secured website or application hosted by an entity that requires a cryptographic key to gain access. In particular embodiments, the system may receive one or more requests to access one or more application programming interfaces. In various embodiments, the system receives multiple requests simultaneously to access one or more application programming interfaces.

At block 310, a channel is communicatively connected to a key management service, where the key management service is a serverless computing platform and at block 315, a cryptographic key is received from the key management service. In example embodiments, the key management service is AWS KMS. In example embodiments, when a user requests access to a website or mobile application, AWS KMS charges a fee for every call made to the AWS KMS. This occurs for every application an entity may have that requires a cryptographic key for access. Thus, tens of thousands of applications may require AWS KMS keys, and each application may get millions of calls from around the country or world depending on the reach of the application. Fetching or retrieving a new key every time is counterintuitive, costly, and wasteful. In examples where the system has received a request to access a first API and a separate request to access a second API, at block 315, a unique cryptographic key is received for each of the requests from the key management service.

At block 320, the cryptographic key is attached to the first application programming interface, thereby creating a first data structure. In the example referenced above, a second cryptographic key is attached to the second API, thereby creating a second data structure. In particular embodiments, a first and second point are attached to the first data structure, thereby creating a first node and a third and fourth point are attached to the second data structure, thereby creating a second node. The first node and the second node are then automatically arranged into a doubly linked data structure. Thus, each node in a doubly linked structure consists of two parts: data and two pointers. The data part holds the actual value or content of the node, while the two pointers point to the pervious and next nodes in the sequence. Accordingly, the doubly linked data structure contains a reference or link for each node in the data structure to both the node's previous node and its next node. This linkage is bidirectional because of the presence of the backward pointers, thereby allowing traversal in both directions, making navigation from any given node to its adjacent node more simple and efficient, regardless of the direction in the sequence or list.

At block 325, the first data structure is stored to a writable storage location or cache, where the writable storage location has a predetermined maximum capacity for data structures. For example, the predetermined maximum capacity for the cached data structures may be limited to just 50 MB, or may reach higher limits depending upon the entities' internal capabilities. The limit is merely predetermined by the developer or the entity creating and using the described system. In example embodiments, the first data structure is stored to the writable storage location using the doubly linked list to store the value of the keys in the nodes, and hashmap is used to store the decrypted value of the key against the encrypted value of the key. Alternatively, any suitable data structure may be used in lieu of a hashmap, including, but not limited to, an array, linked list, stack, queue, tree, graph, or heap. When a key is removed from the doubly linked list, it is likewise removed from the hashmap to maintain the integrity of the data structures. The system utilizes a Least Recently Used (LRU) cache mechanism in conjunction with doubly linked list to track the usage of the keys and a hashmap to store the keys. In alternate embodiments, any suitable form of cache management may be used to store and evict or delete keys. In a LRU cache management system, the main principle is that the least recently used item or data structure is the most likely to be unused in the near future. Thus, the LRU cache mechanism keeps track of the order in which data structures or items are accessed, and when the cache is full and a new item needs to be stored, it replaces the least recently used item with the new one. LRU assumes that recently used items are more likely to be used again in the future.

Conversely, if the system uses a Most Recently Used (MRU) cache mechanism in conjunction with the doubly linked list and hashmap, the main principle is the opposite of the LRU cache. In an MRU, the most recently used items are the most likely to be access again. Thus, this cache mechanism replaces the most recently used item when the cache is full and a new item needs to be stored. MRU prioritizes retaining recently accessed items, as they are believed to have a higher chance of being accessed again. LRU tends to function more effectively in scenarios where there is temporal locality, meaning that recently accessed items are likely to be accessed again soon. On the other hand, MRU tends to be more useful in cases where the timeframe of the access is more important and older items are less likely to be accessed again.

At block 330, a second request to access the first application programming interface is received. At block 335, the stored first data structure is retrieved and used to grant access to the first application programming interface in response to the second request. For example, because the system had already received a request for the access to the first API and had already received a stored a cryptographic key for the first API using the cache mechanism, the system is able to retrieve the cryptographic key from the cache and provide access to the first API for the second request. Alternatively, if the system searched the cache and a cryptographic key for the first API had not already been stored, then the system would make an API call to the AWS KMS requesting a new cryptographic key for the first API.

In some embodiments, a third request to access a second API is also received. Similar to the above, the system is communicatively connected to the KMS and receives a second cryptographic key from the KMS for the third request. The second cryptographic key is then attached to the second API, thereby creating a second data structure. The second data structure is stored to the writable storage location for later retrieval and use when the system receives a request to access the second API. For example, where the system receives a fourth request to access the second API, the system uses the second stored data structure to grant access to the second API.

Advantageously, the behavior of systems and methods disclosed in consideration of computer science fundamentals apply a new way of building a mechanism having software-specific needs and for cloud-based resources that can be used in a wide variety of situations with any type of application. The systems and methods disclosed further modify conventional protocols to update certificates and improves the functioning of a computer and the technical field of cryptography by bypassing the build and deploy process so that fewer API calls are needed to the key management service, which can reduce latencies and costs while improving efficiencies. This is a technical solution to a technical problem. Additionally, this functionality is particularly relevant when enterprises are working in a serverless environment, since otherwise each application would need to be manually packaged with and coupled to each application.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to explain the principles of one or more aspects of the invention and the practical application thereof, and to enable others of ordinary skill in the art to understand one or more aspects of the invention for various embodiments with various modifications as are suited to the particular use contemplated.

It is to be noted that various terms used herein such as "Linux®", "Windows®", "macOS®", "iOS®", "Android®", and the like may be subject to trademark rights in various jurisdictions throughout the world and are used here only in reference to the products or services properly denominated by the marks to the extent that such trademark rights may exist.

20

What is claimed is:

1. A computing system for cryptographic key storage management, the system comprising:
   at least one processor;
   a communication interface communicatively coupled to the at least one processor; and
   a memory device storing executable code that, when executed, causes the at least one processor to:
   receive a first request to access a first application programming interface;
   communicatively connect a channel to a key management service, wherein the key management service comprises a serverless computing platform;
   receive a cryptographic key from the key management service;
   attach the cryptographic key to the first application programming interface, thereby creating a first data structure;
   store the first data structure to a writable storage location, wherein the writable storage location has a predetermined maximum capacity for data structures;
   receive a second request to access the first application programming interface;
   retrieve and use the cryptographic key from the stored first data structure to grant access to the first application programming interface;
   receive a third request to access a second application programming interface;
   communicatively connect to the key management service;
   receive a second cryptographic key from the key management service;
   attach the second cryptographic key to the second application programming interface, thereby creating a second data structure;
   store the second data structure to the writable storage location;
   determine the writable storage location has reached the predetermined maximum capacity for data structures;
   determine a least recently used cryptographic key from one or more data structures stored to the writable storage location; and
   delete the least recently used cryptographic key from the writable storage location.

2. The computing system of claim 1, wherein the at least one processor is further caused to:
   receive a fourth request to access the second application programming interface; and
   use the second cryptographic key from the stored second data structure to grant access to the second application programming interface.

3. The computing system of claim 1, wherein the at least one processor is further caused to:
   attach a first pointer and a second pointer to the first data structure, thereby creating a first node;
   attach a third pointer and a fourth pointer to the second data structure, thereby creating a second node; and
   arrange the first node and the second node into a doubly linked data structure.

4. The computing system of claim 1, wherein the first data structure is a hashmap.

5. The computing system of claim 1, wherein the first data structure is at least one of a hashmap, array, linked list, stack, queue, tree, graph, and heap.

6. The computing system of claim 1, wherein the first data structure comprises a node having a key-value pair.

7. The computing system of claim 1, wherein the writable storage location comprises a cache constructed using doubly linked lists.

8. The computing system of claim 1, wherein the key management service comprises an Amazon Web Services (AWS) Key Management Service (KMS).

9. A computing system for cryptographic key storage management, the system comprising:
at least one processor;
a communication interface communicatively coupled to the at least one processor; and
a memory device storing executable code that, when executed, causes the at least one processor to:
receive a first cryptographic key from a key management service, wherein the key management service comprises a serverless computing platform;
attach the first cryptographic key to a first application programming interface, thereby creating a first data structure;
receive a second cryptographic key from the key management service;
attach the second cryptographic key to a second application programming interface, thereby creating a second data structure;
store the first data structure and the second data structure to a writable storage location;
receive a request to access the first application programming interface;
retrieve and use the first cryptographic key from the stored first data structure to grant access to the first application programming interface
receive a third request to access a second application programming interface;
communicatively connect to the key management service;
determine the writable storage location has reached the predetermined maximum capacity for data structures;
determine a least recently used cryptographic key from one or more data structures stored to the writable storage location; and
delete the least recently used cryptographic key from the writable storage location.

10. The computing system of claim 9, wherein the storage location has a predetermined maximum capacity for data structures.

11. The computing system of claim 10, wherein the at least one processor is further caused to
evict the least recently used cryptographic key from the storage location.

12. The computing system of claim 9, wherein the at least one processor is further caused to:
receive a request to access a third application programming interface;
determine that the storage location does not include a third data structure;
receive a third cryptographic key from the key management service;
attach the third cryptographic key to the third application programming interface, thereby creating a third data structure;

store the third data structure to the storage location;
retrieve and use the third cryptographic key from the stored third data structure to grant access to the third application programming interface.

13. The computing system of claim 9, wherein the first data structure and the second data structure are stored to the storage location using doubly linked lists.

14. The computing system of claim 9, wherein the first data structure and the second data structure are each at least one of a hashmap, array, linked list, stack, queue, tree, graph, and heap.

15. The computing system of claim 9, wherein data structures are stored to the storage location using at least one of a Least Recently Used (LRU) cache strategy and a Most Recently Used (MRU) cache strategy.

16. A computer-implemented method for cryptographic key storage management, the method comprising:
receiving a first request to access a first application programming interface;
communicatively connecting a channel to a key management service, wherein the key management service comprises a serverless computing platform;
receiving a cryptographic key from the key management service;
attaching the cryptographic key to the first application programming interface, thereby creating a first data structure;
storing the first data structure to a writable storage location, wherein the writable storage location has a predetermined maximum capacity for data structures;
receiving a second request to access the first application programming interface;
retrieving and using the cryptographic key from the stored first data structure to grant access to the first application programming interface
receiving a third request to access a second application programming interface;
receiving a second cryptographic key from the key management service;
attaching the second cryptographic key to the second application programming interface, thereby creating a second data structure;
storing the second data structure to the writable storage location;
determining the writable storage location has reached the predetermined maximum capacity for data structures;
determining a least recently used cryptographic key from one or more data structures stored to the writable storage location; and
deleting the least recently used cryptographic key from the writable storage location.

17. The computer-implemented method of claim 16, wherein data structures are stored to the storage location using at least one of a Least Recently Used (LRU) cache strategy and a Most Recently Used (MRU) cache strategy.

18. The computer-implemented method of claim 16, the method further comprising the step of
and
evicting the least recently used cryptographic key from the writable storage location.

* * * * *